(12) United States Patent
Babaian et al.

(10) Patent No.: US 7,065,750 B2
(45) Date of Patent: Jun. 20, 2006

(54) METHOD AND APPARATUS FOR PRESERVING PRECISE EXCEPTIONS IN BINARY TRANSLATED CODE

(75) Inventors: Boris A. Babaian, Moscow (RU); Andrew V. Yakushev, Sergiev-Posad (RU); Sergey A. Rozhkov, Moscow (RU); Vladimir M. Gushchin, Moscow (RU)

(73) Assignee: Elbrus International, George Town (KY)

( * ) Notice: Subject to any disclaimer, the term of this patent is extended or adjusted under 35 U.S.C. 154(b) by 723 days.

(21) Appl. No.: 09/838,552

(22) Filed: Apr. 18, 2001

(65) Prior Publication Data

US 2002/0092002 A1 Jul. 11, 2002

Related U.S. Application Data

(63) Continuation-in-part of application No. 09/505,652, filed on Feb. 17, 2000.

(60) Provisional application No. 60/120,348, filed on Feb. 17, 1999, provisional application No. 60/120,376, filed on Feb. 17, 1999, provisional application No. 60/120,380, filed on Feb. 17, 1999, provisional application No. 60/120,457, filed on Feb. 17, 1999, provisional application No. 60/120,458, filed on Feb. 17, 1999, provisional application No. 60/120,459, filed on Feb. 17, 1999, provisional application No. 60/120, 504, filed on Feb. 17, 1999.

(51) Int. Cl.
*G06F 9/455* (2006.01)

(52) U.S. Cl. .................................................. 717/136

(58) Field of Classification Search ................ 717/129, 717/130, 136, 151, 158; 712/23, 24, 203, 712/212, 228, 230, 235, 244, 237; 714/15, 714/17, 20, 35, 48, 49, 702, 707, 747
See application file for complete search history.

(56) References Cited

U.S. PATENT DOCUMENTS 5,537,559 A * 7/1996 Kane et al. .................. 712/244

(Continued)

OTHER PUBLICATIONS

Chernoff, A, Herdeg, M, Hookway, R, Reeve, C, Rubin, N, Tye, T, Bharadwaj, Ya S, Yates, J. "FX!32 a profile-directed binary translator", Mar./Apr. 1998, IEEE Micro, p. 56-64, retrieved from IEEE Jul. 7, 2004.*

(Continued)

*Primary Examiner*—Wei Y. Zhen
*Assistant Examiner*—Mary Steelman
(74) *Attorney, Agent, or Firm*—Townsend and Townsend and Crew LLP (57) ABSTRACT

Precise exceptions handling in the optimized binary translated code is achieved by transitioning execution to the non-optimized step-by-step foreign code execution means in accordance with one of the several coherent foreign states designated during the optimized translation of the foreign code. A method to improve the operation by avoiding complete foreign state updates in the optimized code, an apparatus to track the switching between the states and a method to recompute the complete foreign state in accordance to the current state identification, execution context and additional documentation provided during the translation time are proposed.

18 Claims, 4 Drawing Sheets

U.S. PATENT DOCUMENTS

| | | | |
|---|---|---|---|
| 5,566,298 A * | 10/1996 | Boggs et al. | 714/10 |
| 5,594,905 A * | 1/1997 | Mital | 710/260 |
| 5,832,205 A * | 11/1998 | Kelly et al. | 714/53 |
| 5,930,509 A | 7/1999 | Yates et al. | |
| 5,958,061 A | 9/1999 | Kelly et al. | |
| 6,105,124 A | 8/2000 | Farber et al. | |
| 6,247,172 B1 * | 6/2001 | Dunn et al. | 717/141 |
| 6,341,324 B1 * | 1/2002 | Caulk et al. | 710/260 |

OTHER PUBLICATIONS

Cmelik, Bob, Keppel, David, "Shade: a fast instruction-set simulator for execution profiling", Sigmetrics May 1994, p. 128-137, retireved from ACM Jul. 7, 2004.*

Gschwind, M, Ebcioglu, K, Altman, E, Sathaye, S, "Binary Translation and Architecture Convergence Issues for IBM System/390", IBM T.J. Watson Research Center, 1999, p. 1-12, <URL: http://www.research.ibm.com/vliw/Pdf/ics00.pdf>, retrieved Jul. 7, 2004.*

Moon, S.M., Chung, H.M.,Park, J., Shim, S.M., Ahn, J.W., "SPARC-based VLIW testbed", IEE Proc.-Comput. Dikgit Tech, vol. 145, No. 3, May 1998, p. 215-224, retrieved from IEEE Jul. 7, 2004.*

Sites, Richard L., et al., "Binary Translation," Communications of the ACM, Feb. 1993, vol. 36, No. 2, pp. 69-81.

Dobberpuhl, Daniel, et al., "Design of EV-4," Communications of the ACM, Feb. 1993, vol. 36, No. 2, p. 82. (one-page—stapled to back of Cite AD above).

Diefendorff, Keith, "The Russians are Coming—Supercomputer Maker Elbrus Seeks to Join x86/1A-64 Melee," Microprocessor Report, Feb. 15, 1999, vol. 13, No. 2, pp. 1-7.

Silberman, Gabriel M., et al., "An Architectural Framework for Supporting Heterogeneous Instruction-Set Architectures," Computer, Jun. 1993, vol. 26, No. 6, pp. 39-56.

Rivest, Ronald L., "The MD5 Message-Digest Algorithm," Memo, Network Working Group, MIT Laboratory for Computer Science and RSA Data Security, Inc., Apr. 1992, 21 pages.

* cited by examiner

METHOD AND APPARATUS FOR PRESERVING PRECISE EXCEPTIONS IN BINARY TRANSLATED CODE

CLAIM OF PRIORITY

This Continuation-in-part application claims priority from co-pending U.S. patent application Ser. No. 09/505,652, filed Feb. 17, 2000, entitled "System for Improving Translation of Software from a Native Computer Platform to a Target Computer Platform," which is a non-provisional of U.S. Provisional Patent Application Nos. 60/120,348, 60/120,376, 60/120,380, 60/120,457, 60/120,458, 60/120,459, and 60/120,504, all filed Feb. 17, 1999; each of which is hereby incorporated by reference as if set forth in full in this document.

CROSS-REFERENCES TO RELATED APPLICATIONS

This Continuation-in-part application is related to co-pending U.S. patent application Ser. No. 09/838,550, filed Apr. 18, 2001, entitled "Method For Effective Binary Translation Between Different Instruction Sets Using Emulated Supervisor Flag And Multiple Page Tables;" U.S. patent application Ser. No. 09/838,532, filed Apr. 18, 2001, entitled "Method for Fast Execution of Translated Binary Code Utilizing Database Cache for Low-Level Code Correspondence;" and U.S. patent application Ser. No. 09/838,530, filed Apr. 18, 2001, entitled "Method for Emulating Hardware Features of a Foreign Architecture in a Host Operating System Environment" each of which is incorporated herein by reference as if set forth in full in this document.

BACKGROUND OF THE INVENTION

The present invention relates to a computer system executing foreign code and more particularly to a computer system and method for efficient handling of exceptions that arise when executing binary translated code.

Complex computer software applications are often written for execution on a specific type of computer architecture. However, when software applications are built from a variety of sources using different design tools, the task of porting the software application to a new platform, based on a different architectural design, is very complex and time consuming. Several techniques have been developed to facilitate the porting of code from a foreign architecture to a different, native, architecture. For example, when source code is available, the foreign code could be recompiled to run under the host architecture. Unfortunately, source code is often unavailable. Alternatively, if only the object or binary code is available, a software program at run-time could interpret the compiled foreign code. The interpreter is written with an understanding of the nuances between the foreign and the host architectures but, unfortunately, software interpretation is an inherently slow process. Accordingly, except in applications where significant performance degradation can be tolerated, software interpreters are unacceptable.

Another technique is to use a hardware emulator to interpret the foreign code. The emulator uses a micromachine that includes specialized hardware to increase the speed of the translation process. Unfortunately, because emulators do not have a microcoded hardware layer underlying the visible machine architecture, they are generally insufficient when the host architecture is based on a reduced instruction set code (RISC).

Yet another technique is to use binary translation to generate a sequence of instructions that perform the same functions and achieve the same behavior as on the foreign platform. When the binary translated code is executed on the host platform, the state information of the foreign architecture is maintained in the registers of the host platform. Although binary translation is an efficient mechanism for executing foreign code in a host environment, it is accepted in the field of computer programming that software programs may include logic errors and run-time errors. Logic errors and run-time errors come to light when the program is executing making it difficult to accurately execute the foreign code in the host environment. Logic errors may cause the program to operate incorrectly or provide incorrect results. Run-time errors often occur when the program is running and a condition is encountered that violates a mathematical or logical rule or attempts to access invalid memory or data. While most programmers extensively test the program before releasing it for use to identify and correct logic errors, it is common practice to provide a plurality of exception handlers to sort out run-time errors (often referred to as exceptions). An exception is a problem or a change in conditions that causes the processor or computer system to stop or suspend execution of the program and respond to the problem in a separate routine, which is often referred to as an exception handler.

An exception is similar to an interrupt in that it refers the processor to a separate set of instructions. In essence, the exception handler initiates a process designed to provide a solution to the problem or to the change in conditions whenever encountered during the execution of the program. Exceptions are synchronous events that are generated in response to certain conditions detected during the execution of an instruction. The exception causes the processor to suspend execution of the program and invoke the operation of another set of programming instructions.

Common exceptions arise, by way of example, when the denominator is zero and a divide instruction is executed; when an overflow occurs as the result of an arithmetic operation; when an invalid processor instruction is encountered; when a page fault occurs or when an illegal operation is detected. Unlike an interrupt, the exception is always reproducible by re-executing the program with the original data that caused the exception. By way of example, a page fault is a typical exception during any program execution, because operating system could swap some pages from memory to external hard disk, and if any memory access operation in user's program touches such swapped page there will be an exception. As the exception occurs, the exception handler in the operating system will load the needed page from disk into the memory and then re-execute faulted user's instruction. Accordingly, the host environment must be capable of responding to these exceptions in a real time environment. Another problem with exception handling arises when instructions are executed out of sequential order in the host environment. When this happens, certain instructions may commit their results and modify registers or memory locations before (or after) the exception is reported to the exception handler. Thus, when the exception handler is invoked in the host environment, the status of the memory, as well as the data in the registers may not accurately reflect the state of the computer system. Accordingly, the host environment must be capable of supporting precise exceptions. Precise exceptions are necessary if a subsequent instruction has committed its result before the exception occurs. When instructions are executed out of sequential order, the status may have changed such that it is not possible to subsequently re-create the state of the system as it existed immediately prior to the exception. To illustrate, when a program executes an ordered set of foreign instructions: i1, i2, . . . in, ie, im, . . . , it is possible that each of these instructions will produce certain side effects that will change the state of various computer resources. Side effects may change the content of registers and memory or set various logical flags in the status register. The exception generated by instruction "ie" is a "precise" exception if instruction "im" has not yet been executed and all prior instructions preceding instruction "ie" have executed and committed their results. A "precise" exception means that instruction "im" has not yet been executed and all prior instructions preceding instruction "ie" have executed and committed their results. When a precise exception occurs, instruction "ie" can be restarted if the instruction pointer (IP) register is preserved. However, if any of the instructions following instruction "ie" in the ordered set, has committed its results then the exception is called imprecise because the state of the computer will have been altered and execution beginning with instruction "ie" cannot be restarted after processing the exception.

The ability to preserve the behavior of the foreign code, including precise exceptions, in binary translated code in a host environment capable of executing instructions in parallel is called "precise exception maintenance." If the host environment is capable of executing instructions in parallel, the exception handler must be able to solve the cause of the exception without using possibly corrupted data and system status information.

Different approaches to maintaining precise exceptions are known in the art. For example, some systems may create a "check point" in the code at which point the normal operation of the system is suspended to save the current state. However, suspending the execution is inherently undesirable if the system is to operate without degrading performance compared to the foreign architecture. In alternative approaches, some systems may employ "speculative execution" where all branches of a code sequence are executed and stored for later use. However, this approach results in an inefficient utilization of system resources.

Clearly what is needed is a method and apparatus for preserving the behavior of the foreign code, including precise exceptions, in binary translated code in a host environment capable of executing instructions in parallel. Further, what is needed a method and an apparatus that automatically determines the cause of the exception and provides an accurate solution to the problem or change in conditions even if the instruction sequence is executed in non-sequential order. Further still, it is desirable to support precise exceptions in a host architecture in a manner that correctly emulates a foreign architecture.

SUMMARY OF THE INVENTION

The present invention provides a system and method for executing binary translated code in a manner that exploits the explicit parallelism of a host computer system and that supports precise exception maintenance. The present invention includes a means for optimizing the execution of binary translated code by reordering of the execution order of pending operations including memory access operations. Further, because any out-of-order memory access will violate precise exception order, the present invention also provides a technique for maintaining precise exceptions in binary translated code executing on a host platform having explicit parallelism architecture. The necessity to translate binary code typically arises where code compiled to execute on a foreign architecture computer system is to be executed on a host computer system based on a different architecture. The two architectures (that is the foreign and the host architecture) may have different instruction sets. For example, the foreign system may have a complex instruction set computing (CISC) architecture. One example of a CISC architecture computer processing system is the Intel x86 architecture, which maintains precise exceptions. In contrast, the host architecture may have explicit instruction level parallelism (EILP) and the ability to execute a plurality of RISC-like operations in parallel. In order to execute foreign code (CISC-based) on the host computer system (EILP-based), a technique called "binary translation" is used. Binary translation means that a foreign code is processed by host software to produce new host code corresponding to the foreign code. The new host code is called binary translated code. To preserve foreign code behavior in binary translated code on the host computer system, the system must maintain precise exceptions.

However, to exploit explicit parallelism of the host processor architecture in binary translated code, the host code must be optimized. Optimization requires extracting the inherent parallelism of the foreign code. The optimization process includes the reordering of operations, including operations that access memory. Advantageously, the present invention permits a reorder of operations with a speculative mode of execution that maintains foreign precise exception order. Speculative mode means that if an operation could generate an exception then, instead of generating a 'real' exception, the host computer system puts a speculative value into the destination register. To denote that a speculative value is stored in the register, an additional bit is associated with every host register. This bit indicates that an operand is speculative. It is only after the speculative value is consumed by an operation in non-speculative mode, that a real exception will be invoked.

The method and apparatus of the present invention further preserves the data and conditions that gave rise to the exception. The invention incorporates an exception-handling scheme that minimizes the necessity to calculate all possible side effects that may be encountered upon execution of commands in the particular instruction set. Instead, the exception-handling scheme responds to the side effects only when required by subsequent instructions.

In accordance with another embodiment of the present invention, a computer system employs a register file for storing temporary values and foreign registers rather than fixed registers in optimized binary translated code for preserving x86's general-purpose registers. Rather than use multiple register sets where one register set shadows the foreign architecture and another set as working registers, the computer system uses a unified register file. The register file is organized with an overlapping window with explicit register renaming of the foreign system's registers. The explicit renaming enables the optimizing translation processes (compilation) to aggressively optimize foreign code. During compilation, state information is saved at a plurality of recovery points in the binary translated code. The saved information includes information that describes which registers correspond to the general purpose registers of the foreign architecture and this information is saved in external memory, e.g. on hard disk or in flash memory. Accordingly, there is no explicit hardware correspondence between the foreign register set and the host registers. The exception handler in the host architecture maintains documentation showing which registers must be used to restore the original foreign register content.

According to the present invention, a host computer system is provided with an additional register and special operation, that enables the preservation of system status information at compile time and restores this information during exception handling. By temporarily preserving the original operands and system status information, operation of the program can be correctly redirected. Thus, when an operation generates an exception, the exception handler quickly determines the state of the computer system prior to detection of the exception. Using this information, the exception handler determines an appropriate solution to the problem, whenever exceptions are encountered during the execution of the program. A significant advantage is that the number of side effects that must be investigated is minimized because of the availability of prior system state information.

In another aspect of the present invention, an interrupt handling system in a computer system is provided. The exception-handling system comprises: 1) a processing unit for calculation of instruction results; 2) a register set for holding valid results after instruction execution; and for saving status information for use on demand by the exception handler; 3) means for marking recovery points in the binary translated code; and 4) an exception handler adapted to access the register set for recovering operands and status information upon detection of an exception.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

The present invention relates to an apparatus and method for handling exceptions in a computer system based on binary translation technology. More particularly, the present invention relates to an improved apparatus and method for efficiently assessing and responding to run-time exceptions in real time. In the following description of preferred embodiments, reference is made to the accompanying drawings that form a part hereof, and in which is shown by way of illustration a specific embodiment in which the invention may be practiced. It is to be understood that other embodiments may be utilized and that changes may be made without departing from the scope of the present invention.

For purposes of illustration, the following description describes the present invention as used with computer systems based, in general, on a single wide word EILP-based processor. However, it is contemplated that the present invention can also be used as a part of computer systems having multiple such processors. It will also be apparent to one skilled in the art that the present invention may be practiced without the specific details disclosed herein. In other instances, well-known structures and techniques associated with the described processor or computer system have not been shown or discussed in detail to avoid unnecessarily obscuring the present invention. Reference will now be made in detail to the preferred embodiments of the invention, examples of which are illustrated in the accompanying drawings. Wherever possible, the same reference numbers will be used throughout in the drawings to refer to the same or like components.

Figure 1:
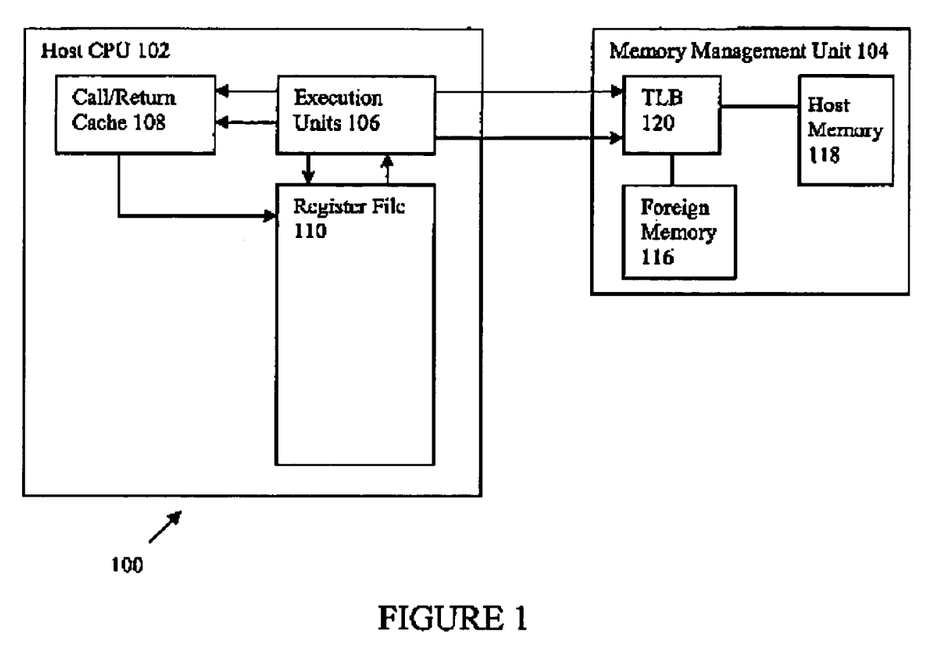
FIG. 1 illustrates a representative embodiment of a host computer system.

Referring now to FIG. 1, a host computer system 100 based on explicit parallelism and wide instruction words architecture with hardware assistance for efficient binary translation is illustrated. Host computer system 100 comprises a computer processing unit (CPU) 102 and a memory management unit (MMU) 104. Host CPU 102 comprises one or more execution units 106 and a call/return cache 108. Execution units 106 include logic to input and retrieve address pairs from cache 108 to facilitate the execution of binary translated code. When translating foreign code, execution units 106 input a foreign address to the call/return cache and retrieve a corresponding host address for use during execution of binary translated code. The CPU 102 also includes a register file 110. Under software control, the registers are explicitly renamed at compile time for holding temporary data or foreign data. The same foreign register may be located in various host registers at run-time. MMU 104 includes logic to form a foreign virtual memory space 116 and logic to form a host virtual memory space 118. The MMU 104 also includes a translation lookaside buffer (TLB) 120 designed to provide translation from virtual to physical addresses and to provide coherence between foreign code in foreign virtual memory 116 and binary translated code in host virtual memory 118. Any access to foreign memory is handled by TLB 120. The dual virtual memory spaces 116 and 118 are used and maintain the content of the foreign virtual memory in a consistent state with the foreign architecture during foreign code execution.

In accordance with the present invention, host computer system 100 is adapted for execution of foreign binary code through software binary translation. As used herein, foreign binary code means computer instructions written for execution on a foreign processing system but ported to the host computer system 100. Compounding the difficulties of executing foreign code is the differences in architecture between the host computer system 100 and the foreign system. In order to execute foreign code, host computer system 100 must first translate foreign binary code to a host language. The translation process rebuilds foreign binary code using a host compiler so that the translated binary program provides a sequence of host instructions that reproduce the behavior of the foreign program on the foreign architecture.

To minimize performance penalties associated with executing binary translated code, host CPU 102 maintains the same data representation and processing as the foreign architecture using host registers 110. The host computer system 100 has foreign architecture independent features and some platform specific features to minimize performance degradation. All of the foreign hardware features that do not influence performance are preferably implemented in software.

Figure 2:
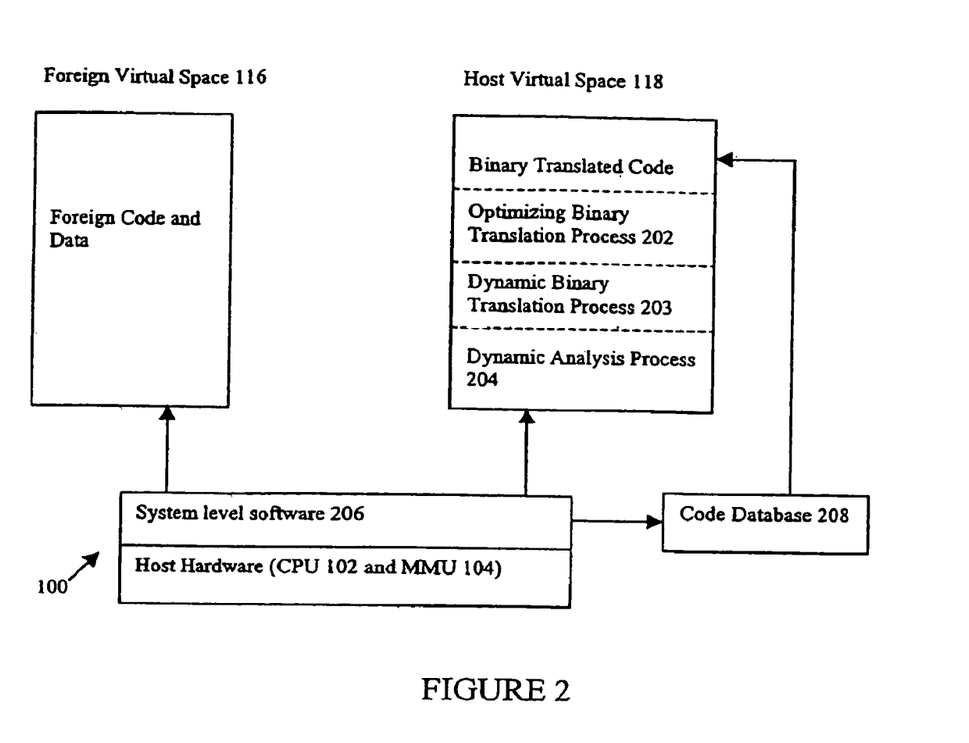
FIG. 2 illustrates a more detailed representation of the host computer system illustrated in FIG. 1.

FIG. 2 shows a block diagram of computer system 100 comprising host CPU 102 and MMU 104 together with hardware support for efficient and reliable execution of binary translated code. Through a software layer 206, CPU 102 operates to execute foreign code on the host system. The process of decoding and semantic substitution is fulfilled in binary translator software. Foreign code is maintained in foreign virtual space 116 while the host processes are maintained in host virtual space 118. After semantic substitution for foreign operations in terms of host operations, the intermediate representation is processed by an optimizing binary translation process 202 to improve performance. Binary translation process 202 does not change the sequence of memory write instructions or, to be more specific, the sequence in which memory write operations (store operations) are performed is the same as in the foreign code. Accordingly, memory write side effects coincide with the behavior expected on a platform based on the foreign architecture. But to optimize performance, load operations can be moved ahead of store operations and to avoid address conflicts, there is a dedicated hardware buffer for address comparing (disambiguation memory). Maintaining the correct order of side effects for load operations is achieved with the present invention as described more fully below.

Foreign code execution on computer system 100 begins with loading foreign code into foreign virtual space 116. After binary translation of the foreign code, which may be facilitated by access to a code database 208, all the pages in the foreign virtual space are write-protected so any subsequent write accesses will cause an exception. This protection mechanism maintains coherence between the foreign code and the binary translated code.

Computer system 100 also includes a dynamic binary translation process 203 and a dynamic analysis process 204. Dynamic analysis process 204 is responsible for processing special situations during execution of the binary translated code that were not discovered during binary translation. For example, self-modifying code, newly created code, and exceptions are all situations that may not be discovered at binary translation time. All new information collected by the dynamic analysis process 204 is saved for further utilization by the optimizing binary translation process 202.

Dynamic binary translation process 203 and optimizing binary translation process 202 work simultaneously. As static binary translator 202 translates foreign code, dynamic binary translator 203 translates the code in optimized mode. When optimized binary translated code is ready, the control switches over to the optimized code at a coherent point for execution. The dynamic binary translator 203 is also used by dynamic analysis 204 to respond to any discovered special situations. Scheduling instruction execution is a function of binary translator 203.

Performance improvements achieved by optimizing binary translator processor 202 may be significantly and negatively impacted when an exception is detected and variables must be calculated. The present invention addresses this problem by saving the contents of registers in temporary locations before executing instructions that could generate an exception. An exception handler uses the information in the temporary location upon detection of the exception. The exception handler recovers the contents of the registers, resets the status flags to a known state and recovers from the error condition in a manner that minimize the side effects that must be resolved.

As will be appreciated by one skilled in the art, there are two types of events that may be encountered during execution of foreign code: interrupts and exceptions. Interrupts are asynchronous events generated by external devices (e.g. hard disk controller, timer, keyboard controller etc.) and are independent from the execution of operations. This means that interrupts can occur at any time when any operation is executing.

Exceptions, on the other hand, are synchronous events and are generated by execution of certain individual operations. For example, when an operation is executed that attempts to access an incorrect memory location, a page fault exception will occur. If the processor executes an operation using unacceptable input operands for arithmetic instruction, then an arithmetic exception will occur. When the execution of an instruction generates the exception, it will repeatedly occur each time that the program is run unless some action is taken to correct the underlying problem. Synchronous exceptions can be either a precise exception or an imprecise exception. When a program executes an ordered set of foreign instructions: i1, i2, . . . in, ie, im, . . . , it is possible that each of these instructions will produce certain side effects that will change the state of various computer resources. Side effects may change the content of registers and memory or set various logical flags in the status register. The exception generated by instruction "ie" is a "precise" exception if instruction "im" has not yet been executed and all prior instructions preceding instruction "ie" have executed and committed their results. When a precise exception occurs, instruction "ie" can be restarted if the instruction pointer (IP) register is preserved. However, if any of the instructions following instruction "ie" in the ordered set, has committed its results then the exception is called imprecise because the state of the computer will have been altered and execution beginning with instruction "ie" cannot be restarted after processing the exception.

Figure 3:
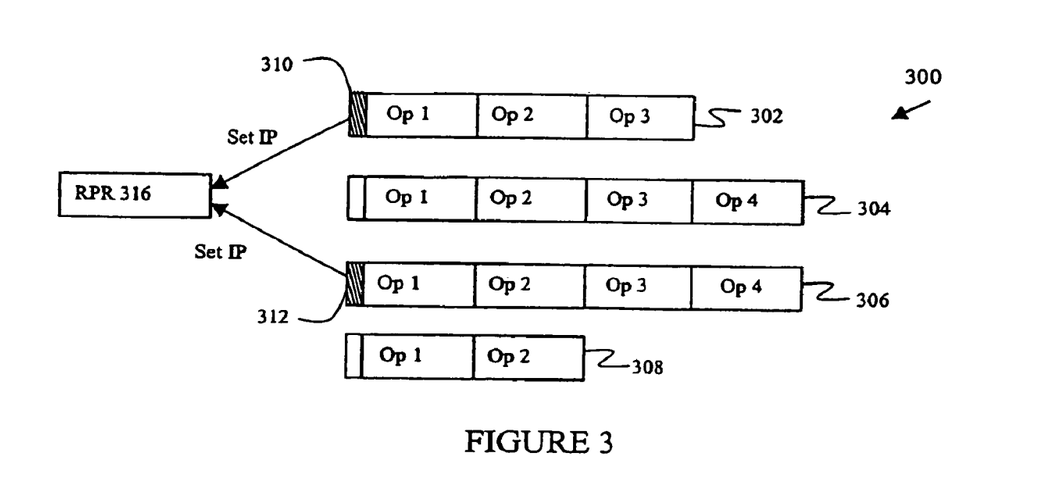
FIG. 3 illustrates the wide instruction word architecture with recovery points of the host computer system of FIG. 1.

The ability to preserve the behavior of the foreign code, including precise exceptions, in binary translated code on host computer system 100 is called "precise exception maintenance." However, where host computer system 100 is based on a wide instruction word architecture that packs several RISC-like instructions into each instruction word, maintaining precise exceptions is difficult if performance is to be maximized by utilizing the inherent advantages of parallel execution. More specifically, as illustrated in FIG. 3, the architecture of the host computer system uses a variable length, very long instruction word format 300. Each instruction word 302–308 includes a plurality of 32-bit instruction syllables describing operations, such as indicated by the Op1–Op4 notation. Each operation in an instruction may be executed in parallel by execution units 106 (FIG. 1). In one preferred embodiment, the host architecture is based on wide instruction word architecture with explicitly scheduled resources, that is, the compiler schedules the resources when the host code is compiled. The host architecture allows up to four memory-access operations in one wide instruction. Also, the host architecture allows several arithmetic and logic operations in the same wide instruction where each host operation may have up to two source operands and one destination. To exploit the explicit parallelism of this architecture with respect to binary translated code it is necessary to optimize the binary translated code in a manner that maintains precise exceptions.

In the present embodiment dynamic binary translator 203 (FIG. 2) can generate host code for every foreign instruction in sequential order with the following properties. Dynamic binary translator uses a subset of host registers in register file 100 (FIG. 1) to map the foreign registers into the host registers.

Associated with selected instruction words, such as instruction 302 and 306, is a tag bit 310 and 312, respectively. It will be appreciated that additional tag bits could be provided and there is no intention to limit the number of tag bits that may be designated in any sequence of binary translated code. Each tag bit causes the current instruction address to be saved to a recovery point register (RPR) 316. Tag bits 310 and 312 and RPR 316 are provided in the hardware layer of computer system 100. In alternative embodiments, tag bits and the recovery point register is implemented using a dedicated instruction such as a set instruction pointer (SetIP). More specifically, the SetIP instruction saves the current instruction address to RPR.

The present invention optimizes the binary translated code by extracting the parallelism inherent to foreign code during the binary translation process by reordering the sequence of operation and memory access. Because any out-of-order memory access will violate precise exception order, the present invention provides a technique for maintaining precise exceptions in binary translated code executing on a host platform having explicit parallelism architecture. The present invention maintains precise exceptions in binary translated code during execution on the host architecture by employing a set of host registers and a dedicated memory region where the information about foreign state (that is where the foreign register set is located in the host registers) is maintained. In order to maintain precise exception order, a set of "Recovery Points" (RP) are included in the binary translated code, with the following properties:

1) Any Recovery Point in the host code has correspondence with an instruction in the foreign code;
2) Every Recovery Point is described by a documentation set, saved on hard disk or in memory, that contains information where all foreign registers are located in the host registers in the optimized binary translated code (because the host binary translator may have renamed registers to extract more parallelism from the foreign code);
3) Any synchronous exception between adjacent Recovery Points can be reinvoked by interpreting foreign instructions starting from the previous Recovery Point, i.e. foreign context (foreign registers and memory) must not be changed in the optimized binary translated code irretrievably.

Accordingly, the translation process must obey the following rules:

1) Every memory write operation into the foreign memory space 116 (FIG. 2) must be a Recovery Point because this operation changes the foreign content in an unrecoverable manner. Additional operations may be allowed to mark a corresponding operation in foreign memory space as a Recovery Point to simplify register reuse;
2) The contents of host registers which is correspond to the last dynamically preceding Recovery Point must be maintained until the next Recovery Point reached in order to have the ability to restore foreign registers' context for the last RP;
3) Put host registers' names used for the foreign registers into the documentation for every RP and reuse these host registers in optimizations only after passing next RP;
4) Mark every Recovery Point in the host code by special "SetIP" operation or special tag in the wide instruction, which keeps the host address of the wide instruction for the marked Recovery Point in the Recovery Point Register 316 (FIG. 3).

In operation, instructions executed by CPU 102 may change the state of the computer resources such as registers in the register file 110, the content of memory or the behavior of peripheral devices. These state changes are referred to as the "side effects" of the instruction.

In accordance with the present invention, CPU 102 temporarily preserves register data and system status information before executing instructions that will calculate a variable. Using this information, the handler has the ability to reconstruct the cause of the error and to enable prompt and automatic recovery when the exception is encountered. By temporarily preserving the original operands and system status information, operation of the program can be correctly redirected by the exception handler rather than merely terminating execution of the program. More specifically, since the prior contents of the operands and system status are known, the exception handler can determine the state of the computer system immediately prior to the detection of the exception because the present invention preserves the data and conditions that gave rise to the exception.

Operands in the temporary registers are retained until reassigned by another operation. If there is an exception, operands are recalculated by re-executing the instruction to recover any "side effects." Although this method of dealing with exceptions requires unused registers, a portion of the general-purpose registers in register file 110 will be allocated to function as the set of temporary registers.

One advantage associated with using the temporary registers is that when side effects occur, the present invention does not immediately invoke an exception handler in response thereto. For example, it is possible, especially when executing translated binary code, that an instruction may generate a page fault due to an erroneously calculated variable. However, rather than responding to the side effects generated by an exception condition, the present invention invokes the exception handler prior to the side effects being generated. This permits the exception handler to respond because all registers and memory cells remain valid. This is superior to having to undo the side effects after the exception has been detected.

In one preferred embodiment particularly useful for use with binary translated code, the operands for an executing instruction are separately maintained until reassigned by another instruction. Execution of this embodiment is particularly useful if general-purpose registers are available. In the event of an exception, the exception handler may recalculate the previous instruction in a manner that any side effects are handled in a manner consistent with how this instruction sequence would have executed.

In another preferred embodiment, the host computer system is based on wide instruction word architecture with explicit execution of instructions in parallel. In this architecture, every instruction contains several RISC-like operations that are concurrently executed. To exploit the explicit parallelism of wide instruction word architecture in binary translated code, the present invention optimizes the binary translated code in accordance with the capabilities of the host platform. The optimizing process extracts the parallelism inherent to foreign code during the binary translation process thereby reordering the sequence of operation and memory access. Unfortunately, the reordering of operations violates the precise exception order. The present invention maintains precise exceptions in binary translated code during execution on the host architecture by employing a set of host registers and a dedicated memory region. The memory region is where the information about foreign state (that is where the foreign register set is located in the host registers) is maintained to achieve limited parallelism. Referring again to the instruction sequence: i1, i2, . . . in, ie, im, . . . , when the instruction "ie" generates an exception, the foreign state is not immediately changed. Rather, after handling the exception, the IP register will still contain the address of instruction "ie." Earlier executing instructions in the ordered set will commit their results to the foreign state. Instructions following instruction "ie" will not commit their results until after the return from the exception handling routine. Accordingly, precise exceptions in the binary translated code are maintained. Unfortunately, the parallelism of the binary translated code is limited because of the necessity to maintain ordered execution. Thus, the efficiency of the host architecture is not fully utilized.

To maximize the efficiency of the host architecture, the present invention recognizes that there is a set of instructions in the foreign architecture that will never generate exceptions. For example, the x86 instruction set includes certain instructions to perform integer or logical register arithmetic operations. These instructions, such as the ADD eax, ebx operation and the MOV esp, ebp operation, will not generate an exception. The x86 instruction set also includes a class of instructions that may produce exceptions. Floating point arithmetic operations, memory access operations or operations that have an operand in memory may generate an exception. One example of exception generating instructions is the floating point multiply, (FMUL st0, st1) operation where "st0", "st1" refer to the x86's floating point registers. Another example is the subtract operation (SUB edx, [ebp+4]) where a memory value is subtracted from a register value. It will be appreciated by one familiar with the x86 architecture that the expression "[ebp+4]" means that the second operand is in memory with the address calculated by addition of the content of register "ebp" and a constant at run-time.

Figure 4:
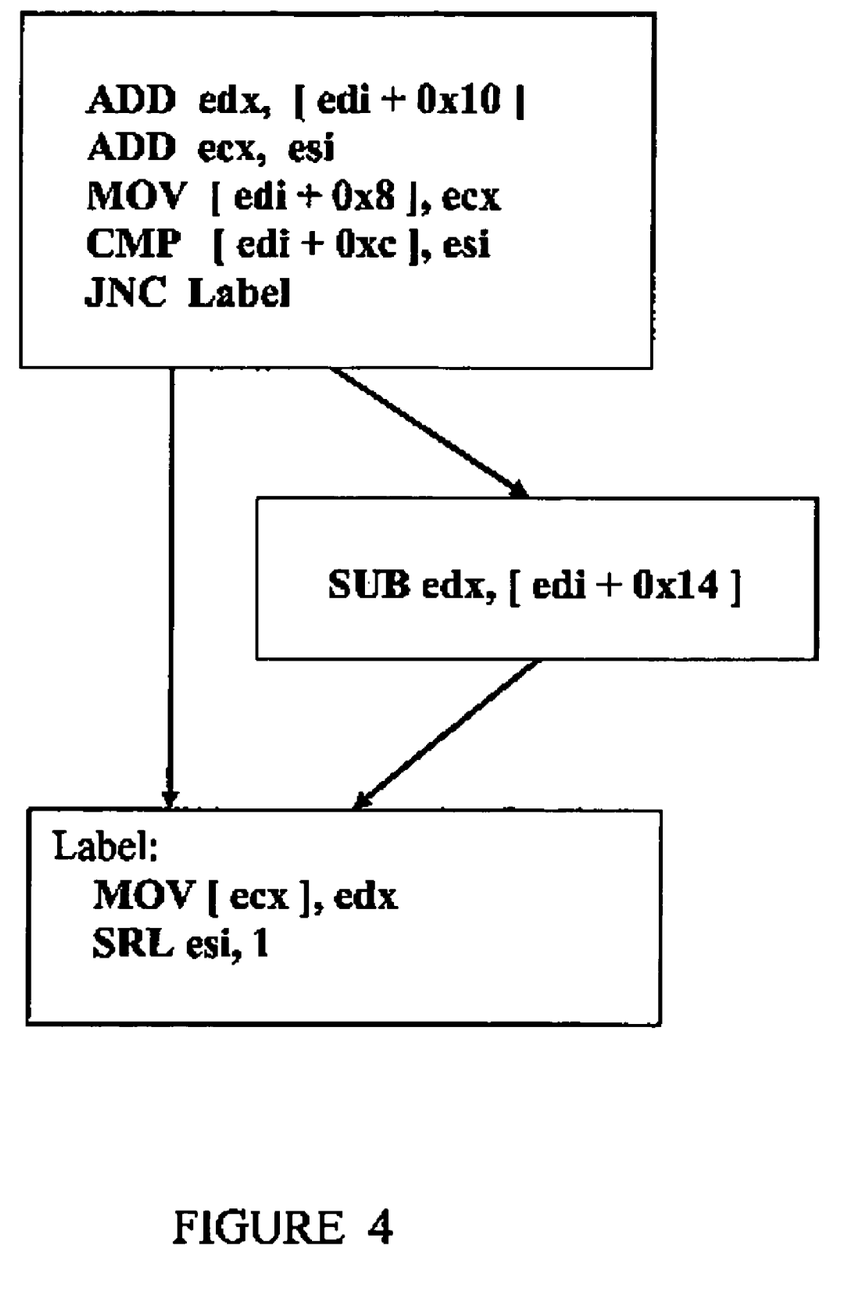
FIG. 4 illustrates an example of a control flow graph for foreign code.

Refer to FIG. 4, where an example of foreign code fragment is shown. This foreign code fragment will be binary translated to host code while maintaining precise exceptions handling. The initial binary translation produces a simple sequential binary translation of the foreign code fragment where each foreign instruction is translated to a sequential set of host instructions.

By way of example, for the x86's code sequence:

```
            ADD edx, [edi + 0x10]
            ADD ecx, esi
            MOV [edi + 0x8], ecx
            CMP [edi + 0xc], esi
            JNC Label
            SUB edx, [edi + 0x14]
Label:
            MOV [ecx], edx
            SRL esi, 1
```

The resulting host code comprises a set of RISC-like operations that would perform the same function as the foreign code fragment. This host code is a literal translation and does not take advantage of the parallel architecture of the host platform. Specifically, the computer system maintains designated host registers denoted by "r", used for holding temporary values, and host registers, which hold foreign registers data by the same names as in the foreign architecture.

```
1  LD [edi + 0x10], r1                  #
2  ADD,f r1, edx, edx & flags           # ADD edx, [edi + 0x10]
3  ADD,f ecx, esi, ecx & flags          # ADD ecx, esi
4  ST ecx, [edi + 0x8]                  # MOV [edi + 0x8], ecx
5  LD [edi + 0xc], r1                   #
6  CMP,f r1, esi, flags                 # CMP [edi + 0xc]
7  CCTOLP flags|nc –> p[0]              #
8  CT Label, p[0]                       # JNC Label
9  LD [edi + 0x14], r1                  #
10 SUB,f edx, r1, edx & flags           # SUB edx, [edi + 0x14]
Label:
11 ST edx, [ecx]                        # MOV [ecx], edx
12 SRL,f esi, 1, esi & flags            # SRL esi, 1
```

The foreign code fragment shown above begins by performing an ADD operation. This operation first obtains the value at a memory location identified by summing the contents of the EDI register and a constant, 0×10. The value from memory is then added to the contents of the EDX register. This operation is emulated by the first two RISC-like instructions depicted on the left. Specifically, in the host code, a load operation is executed to move the value stored in memory to a register R1. Then, an ADD,f operation adds the contents of register R1 to the contents in the EDX register with the result stored in the EDX register and obtains condition codes in the host register FLAGS in the host register file.

The second foreign ADD operation adds the contents of the ECX register to the contents of the ESI register. To obtain the same results, requires only a single ADD,f operation with the result stored in the ECX register. In a similar manner, the MOV operation is replicated as a single host code store instruction storing the value in the ECX register to the indicated memory location.

The foreign compare operation CMP first retrieves the value stored in the memory location indicated by the sum of the value in the EDI register and a constant, 0×c and compares it to the value in the ESI register. The compare operation subtracts the source operand in the ESI register from the destination operand but does not save the result. To obtain the same result in host code, a pair of instructions is required. Specifically, a LOAD instruction loads register R1 with the value obtained from the specified memory location. The value in R1 is compared to the value in the ESI register with the result of the operation setting bits in the flag status register.

Following the compare operation, a jump instruction tests the carry flag. As illustrated in FIG. 4, if there is no carry, program flow proceeds to the instruction associated with the "Label" but, if there is a carry, program flow proceeds to the subtract operation. In a similar manner, the host code, tests the flag register to determine if the compare operation set the carry flag. If there is no carry, program flow proceeds to the operation defined by "Label". The host operation "CCTOLP flags|nc->p[0] " means the condition codes from the host register FLAGS are converted into a logical predicate "p[0] ". If the no carry condition (that is, the predicate p[0] value) is true, the operation transfers control to the target address named "Label". Otherwise, in both the foreign and host code fragments, the program proceeds to the SUB operation as illustrated in FIG. 4, respectively.

In the host code fragment illustrated above, every memory access operation could cause an exception. However, as illustrated, the order of operation is not changed, so the register and memory context will be the same as in the foreign architecture. The host architecture has a property that each exception interrupts execution of the operation that caused the exception. However, the exception does not influence other simultaneously executing operations in the wide instruction itself, each of which will complete execution and commit its result. Accordingly, the translated binary code maintains the precise exception property.

In order to increase execution speed and improve the performance of the foreign code on the host platform, it is desirable to schedule execution of the instructions in a non-sequential order. However, one skilled in the art will recognize that re-ordering execution of the operations will not enable precise exceptions to be maintained. It will also be recognized that the key to maintaining precise exceptions is to preserve the order of memory write operations because such operations irretrievably change memory context.

By way of example, the compiler could move the memory read operation (operation 9) above control transfer operation (operation 8). However, reordering instructions violates precise exception order. When code is reordered, the host platform uses a special mode of execution called "speculative mode". Speculative mode means that if an operation could generate an exception then, instead of generating a 'real' interrupt, the host computer system puts a speculative value into the destination register, which is called "diagnostic operand". To denote that a speculative value is stored in the register, every host register in the host register file has an additional bit that marks each "diagnostic operand". It is only after a diagnostic value is consumed by an operation in non-speculative mode, that a real exception will be invoked.

After scheduling elementary host operations by optimizing binary translator into wide instructions, the host code looks like:

1 LD [edi+0×10], r1; ADD,f ecx, esi, r2 & r3; LD [edi+0×c], r4; LD,s [edi+0×14], r5

2 SetIP; ADD r1, edx, r1; ST r2, [edi+0×8]; CMPnc r4, esi->p[0]; CMP,f r4, esi, r6

3 SRL,f esi, 1, r4 & r5; SUB,f r1, r5, r1 & r6 (~p[0])

4 SetIP; ST r1, [r2]

Here postfix "s" in the last operation LD in the first wide instruction means "speculative execution mode", operation CMPnc generates predicate value "p[0]" true if condition is "not carry" is true. Another compare operation CMP,f generates condition codes in the host register R3. Operation SUB,f in the third wide instruction is executed if predicate value "p[0]" is false.

There are three Recovery Points in the code. The first one describes register contents before starting execution. The second point (second wide instruction) is described by the following documentation:

| Foreign register | Host register |
|---|---|
| EDX | R1 |
| ECX | R2 |
| ESI | (not changed) |
| FLAGS | R3 |

The second point is described by this documentation because registers R1, R2 and R3 have been released by the host optimizing scheduler and then reused in further calculations. After finishing execution of the code the documentation will have the following contents:

| Foreign register | Host register |
|---|---|
| EDX | R1 |
| ECX | R2 |
| ESI | R4 |
| FLAGS | R5 |

Here, there are only four wide instructions without branch operation instead of eight operations in the original foreign code.

Suppose there is an exception "Page fault" (virtual memory page is absent) in the first wide instruction in "LD,s" operation. It is executed in speculative mode, so hardware puts "diagnostic value" into the register "r5". Then execution passes the second Recovery Point and operation "SetIP" puts address of the second wide instruction into the register RPR. Suppose that operation "CMPnc" in the second wide instruction generates "false" value for the logical predicate p[0].

After that real exception at operation "SUB" will occur. Such kind of exception ("diagnostic operand") is precise at the host platform and the whole third wide instruction won't be executed. Then host exception handler 532 (FIG. 5) will be invoked. It takes wide instruction address from the RPR register and extracts correspondent documentation for the Recovery Point being addressed by the value of instruction pointer in the RPR register. On the base of this documentation the exception handler determines a foreign operation which the process of recovery process should be started from.

In the example above it is "MOV [edi+0×8], ecx" (memory write) operation in the foreign code (FIG. 4). Then the exception handler forms foreign register context by moving values from host registers, corresponding to the foreign registers, to the host registers, which software uses as a foreign registers for both dynamic and optimizing binary translators:

r1->edx
r2->ecx
r3->flags

Figure 5:
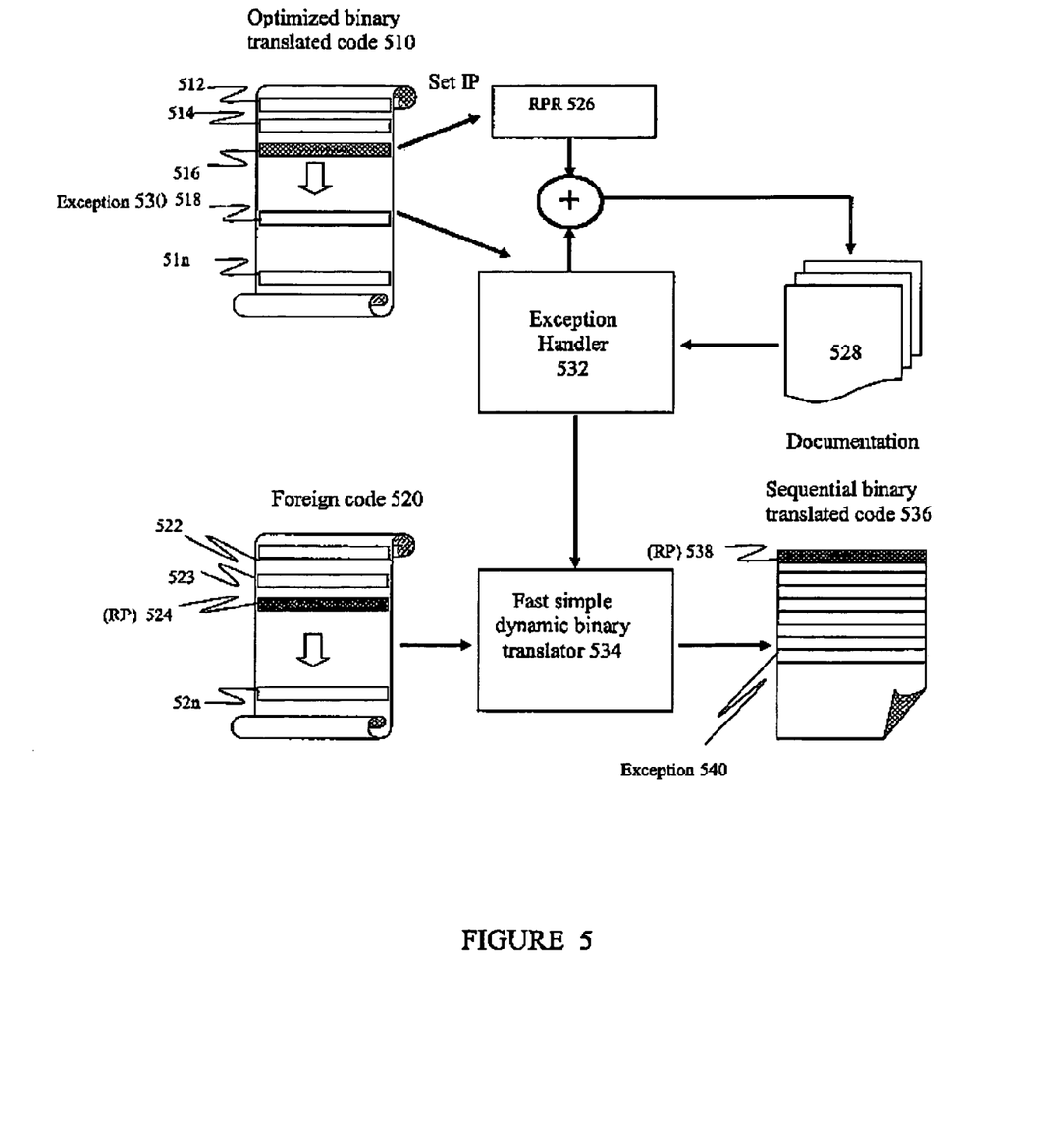
FIG. 5 illustrates a flow chart of precise exception processing in the host optimized binary translated code.

Then, the fast dynamic binary translator 534 (FIG. 5) begins the sequential translation of foreign operations and execution:

CMP [edi+0xc], esi    -> LD [edi+0xc], r1
    CMP,f r1, esi -> flags
JNC Label    -> CCTOLP flags/nc -> p[0] # p[0] is false
    CT Label, p[0]   # not executed
SUB edx, [edi+0x14]    -> LD [edi+0xc], r1  # Page fault occurs All values in the software foreign registers (general-purpose registers, flag register) are correct at the moment of the exception and control can be transferred to binary translated foreign exception handler correctly.

Referring now to FIG. 5 where a flow diagram of a preferred method for precise exception processing in binary translated code. Program flow of the optimized binary code is illustrated at 510 where execution proceeds sequentially from instruction 512 to instruction 516 and so on to instruction 51*n*. At instruction 516, a "Recovery Point" (RP) is detected. RP instruction 516 in the host code has correspondence with a specific identified instruction in the foreign code, which is illustrated at 520. More specifically, the foreign code 520 comprises a sequence of instructions 522 to instruction 524 to instruction 52n. In this example, RP instruction 516 corresponds to instruction 524 in the foreign code. One skilled in the art will appreciate that there may be a significant number of RP instructions designated in each sequence of binary translated code, whether optimized or not.

When RP instruction 516 is detected, Recovery Point Register (RPR) 526 is loaded with the value of the instruction pointer, that is, the memory address of instruction 516. In the preferred embodiment, host computer system 100 includes a special operation "SetIP" that sets the IP for each wide instruction into the RPR. This transfer happens whenever RP instruction 516 is executed. Associated with each RP instruction is a set of documentation that describes the location of the foreign registers in the optimized binary code. The documentation is created during the optimizing binary translation processes 202. The interpreters use documentation 528 to find host registers because the compiler may rename registers to extract more parallelism from the foreign code.

When an exception 530 occurs at instruction 518, execution is transferred to exception handler 532. Using the IP address available from RPR 526, exception handler 532 then accesses documentation 528. With the information provided by documentation 528, exception handler 532 is able to recreate the state of the host computer system at the most recently executed recovery point.

Exception handler 532 invokes a dynamic binary translator 534. Dynamic binary translator 534 may be the same as binary translator 203 or it may be a simplified version thereof. When exception handler 532 invokes binary translator 534, the foreign code 520 is accessed beginning at the nearest recovery point, which in FIG. 5, corresponds to instruction 524. Using the run-time values, binary translator 534 regenerates sequential binary translated code as indicated at 536. The first instruction in code sequence 536 corresponds to the recovery point, that is, instruction 538. Execution proceeds to the instruction that would correspond to instruction 518, which caused exception 530. If the exception, such as exception 540 re-occurs, exception handler 532 will report the problem to the foreign exception handler which, if not already exist in binary translated form, will be binary translated into the host code. Otherwise, execution proceeds to the next control transfer operation and switches back to the optimized binary translated code 510. It will be appreciated that any exception occurring between Recovery Points requires that exception handler 532 begin interpreting foreign code 520 from a correspondent Recovery Point in the foreign code. Accordingly, the foreign context in optimized binary translated code must not be changed irretrievably between Recovery Points. Thus, preliminary register information must be retained and the registers cannot be reused until execution reaches a recovery point. The advantage of this method is that the dynamic binary translator 534 eliminates the optimization by re-executing the code in a sequential manner. It affords the opportunity to easily reconstruct the conditions that caused the exception in the optimized code and restore the correct foreign context to the state just prior to the exception.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

What is claimed is:

1. A binary translation system, comprising:
a non-optimizing foreign code execution module configured to maintain dedicated foreign state for each foreign binary operation executed allowing for the exceptions arisen to be handled precisely; and
an optimizing binary translator configured to translate foreign binary operations into optimized sequences of host operations in such a way as to improve the speed of execution of the sequences; and
a host CPU configured to execute the host operations; and
a documentation generator configured to generate a set of documentations for optimized sequences of host operations, wherein each documentation describes operations required to calculate a corresponding foreign state for an appointed point;
a documentation tracker configured to record host operation addresses at appointed points of the host operation sequences being executed, wherein, for each host operation address, operations required to calculate a corresponding foreign state for the host operation address are added to documentation; and
a recovery mechanism configured to select a documentation in the set of documentations using a host operation address corresponding to the selected documentation, wherein the recovery mechanism is configured to perform the operations saved in the documentation to calculate the corresponding foreign state for the host operation address and to continue foreign codes execution in case of the exception arisen during the execution of the corresponding optimized host codes.

2. The binary translation system of claim 1, wherein the sequence of host operations consumes input values from the dedicated foreign state and puts output results into the said foreign state.

3. The binary translation system of claim 2, wherein the dedicated foreign state is not changed in case of exception arisen during execution of the host operations sequence.

4. The binary translation system of claim 3, wherein a foreign exception handler is executed in response to the exception occurring during execution of the host operations sequence, the foreign exception handler configured to take input values from the unchanged dedicated foreign state.

5. The binary translation system of claim 1, wherein the optimizing translator is configured to combine all host operations sequences corresponding to a number of foreign binary operations into one executable unit.

6. The binary translation system of claim 5, wherein the optimizing translator removes intermediate outputs from the dedicated foreign state for each sequence of host operations and saves information about the intermediate outputs in the documentation.

7. The binary translation system of claim 6, wherein the documentation describes a virtual foreign state between each sequence of host operations.

8. The binary translation system of claim 7, wherein the optimizing translator preserves values from each virtual state in temporary registers without re-using them until next virtual foreign state is passed.

9. The binary translation system of claim 8, wherein every memory write operation changes unconditionally the dedicated foreign state and is considered as a possible recovery point in case of exception.

10. The binary translation system of claim 9, wherein the recovery point corresponds to one of the virtual foreign states as described in the documentation.

11. The binary translation system of claim 10, wherein the documentation is a host to foreign registers computation rules table or host binary code used to recompute the foreign state.

12. The binary translation system of claim 1, wherein the host CPU is configured to execute host operations and produces exceptions as if it were a foreign CPU.

13. The binary translation system of claim 1, wherein documentation tracker is a special host operation, a recovery point register and an apparatus for saving instruction address in the recovery point register in response to executing the recovery point operation.

14. The binary translation system of claim 1, wherein the recovery mechanism is a host program configured to recompute a correct dedicated foreign state according to the documentation in the case of an exception generated.

15. A method of recomputing a dedicated foreign state in a binary translation system from documentation generated by an optimizing translator in a case of an exception arising during execution of optimized binary translated code translated from a foreign code, the method comprising:
    designating a set of recovery points in the optimized binary translated code during optimized translation of the foreign code, wherein each recovery point represents a foreign state;
    generating a set of documentations during the optimized translation of the foreign code, wherein each documentation in the set of documentations corresponds to a recovery point in the optimized binary translated code and describes operations required to calculate a corresponding foreign state for the recovery point; and
    using one of the documentations in the set of documentations corresponding to executed optimized binary translated code when an exception arises during its execution to recover a foreign state corresponding to a recovery point for the exception, wherein the foreign state is recovered by executing the operations for the one of the documentations.

16. The method of claim 15, wherein the documentation describes a virtual foreign state and is discovered by using a recovery point register.

17. The method of claim 16, wherein the optimizing translator sets recovery point operations in the host code in such a way that there is no unconditional changes in the dedicated foreign state between adjacent recovery points.

18. The method of claim 17, further comprising:
    detecting an exception in the optimized binary translated code;
    reading the recovery point register;
    finding the appropriate documentation in the set of documentations corresponding to contents of the recovery point register;
    recomputing a foreign state according to the documentation;
    switching execution of the foreign code to non-optimizing execution;
    executing each foreign code operation in sequence;
    updating a dedicated foreign state at the end of each foreign code operation;
    detecting an exception during the course of non-optimizing execution; and
    transferring contents of the dedicated foreign state to the foreign exception handler.

* * * * *

UNITED STATES PATENT AND TRADEMARK OFFICE
CERTIFICATE OF CORRECTION

| | |
|---|---|
| PATENT NO. | : 7,065,750 B2 |
| APPLICATION NO. | : 09/838552 |
| DATED | : June 20, 2006 |
| INVENTOR(S) | : Babaian, Boris A. et al. |

It is certified that error appears in the above-identified patent and that said Letters Patent is hereby corrected as shown below:

On Title Page, col. 1 Please add Item (75), *Inventors*:

Alexander V. Ermolovich, Moscow (RU)
Valentin G. Tikhonov, Moscow (RU)

Signed and Sealed this

Fifth Day of September, 2006

JON W. DUDAS
*Director of the United States Patent and Trademark Office*